July 28, 1959   W. H. DUBBERKE   2,896,315
METHOD FOR POSITIONING A WHEEL UPON AN AXLE MEMBER
Original Filed May 31, 1957
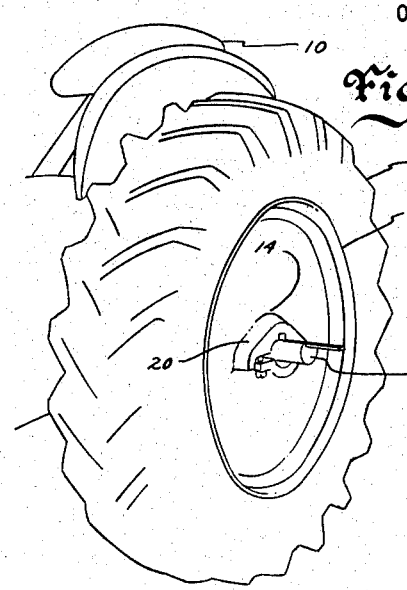
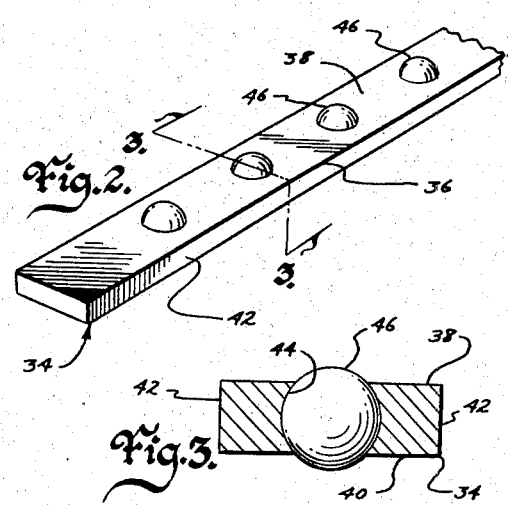
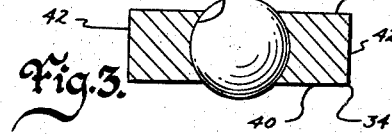
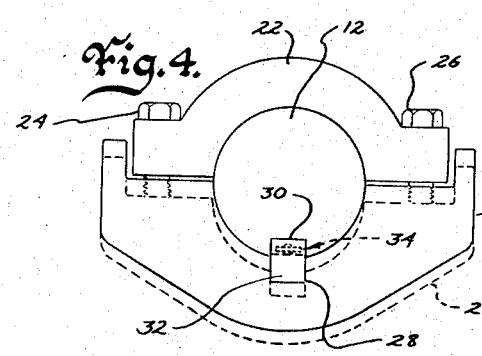
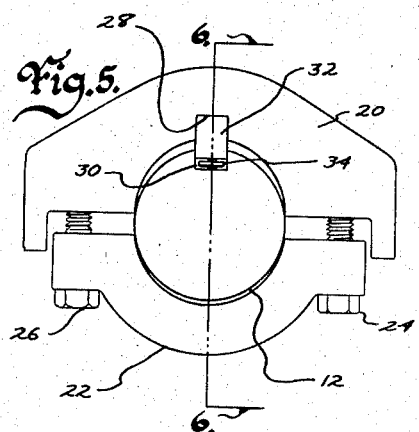
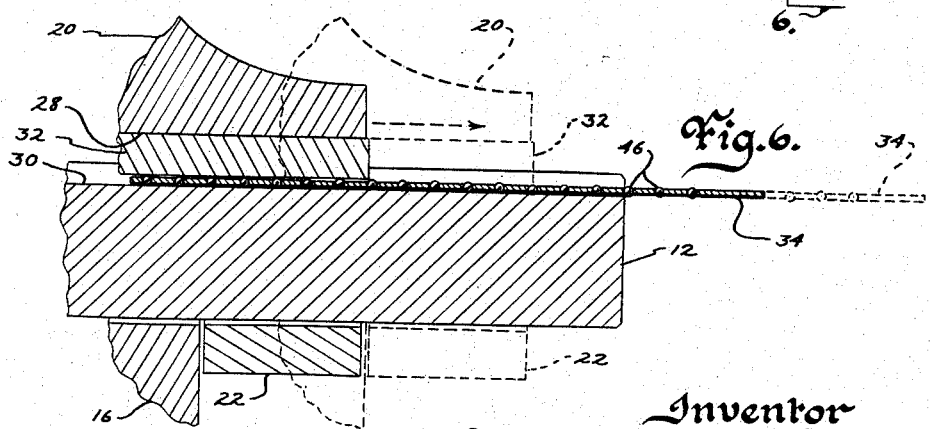
Witness
Edward P. Seeley
Inventor
Walter Harley Dubberke
by Talbert Dick and Zarley
Attorneys

United States Patent Office 2,896,315
Patented July 28, 1959

2,896,315

METHOD FOR POSITIONING A WHEEL UPON AN AXLE MEMBER

Walter Harley Dubberke, Hubbard, Iowa

Original application May 31, 1957, Serial No. 662,871. Divided and this application June 11, 1958, Serial No. 741,427

2 Claims. (Cl. 29—400)

My invention relates to a wheel positioning method and more particularly to the method of positioning on a keyway axle a wheel that has a size adjustable hub. This application is a divisional application from my co-pending application Serial Number 662,871 filed May 31, 1957.

Many types of wheel supported machinery require that the spaced apart distance between the wheel members on a single axle be periodically changed. This is particularly true of the farm tractor which has the distance between its rear wheels changed many times. This wheel adjustment is brought about by the fact that the distance between rows of various crops differs, therefore requiring a corresponding change in the wheel alignment of the tractor that will be used upon the different crops. Furthermore, certain attachments placed on the tractor necessitate wheel adjustment. For example, a corn picker may require different whel spacing than a cultivator.

Most tractors of today have a keyway slot in their rear axles. The wheel is placed on the axle by means of an adjustable hub member. The hub member is adjustable in that it has an adjustable-sized opening to embrace the axle and is tightened or loosened to and from the axle by decreasing or increasing, respectively, the size of the opening. To assist in the engagement of the tightened hub with the axle, a key member generally rests in two registering keyway slots located in the wheel and the axle. It is to this type of structure that my invention relates.

The greatest difficulty in adjusting the position of the wheels on the above described tractors arises because of the great weight of the liquid filled tires on the tractor. The tractor tires are filled with liquid to give the machine ballast and traction. Even when the hub of such a wheel on a jacked-up tractor is loosened with respect to the axle, the heavy wheel cannot be slidably moved along the axle without much effort being applied. As a practical matter, one man cannot adjust the spacing of his tractor wheels by himself, and many times various special tools are needed to complete the operation besides the need for additional manpower.

Therefore, the principal object of my invention is to provide a method for facilitating the positioning of wheels upon axle members having a keyway slot.

A further object of my invention is to provide a method for positioning wheels upon axle members having a keyway slot which can be practiced by an individual person.

A still further object of my invention is to provide a method for positioning wheels upon a keyway axle which will not require the use of a plurality of tools.

These and other objects will be apparent to those skilled in the art.

My invention consists of the method for positioning a wheel upon an axle member, whereby the objects contemplated are attained as hereinafter more fully set forth, specifically pointed out in my claims and illustrated in the accompanying drawings, in which:

Fig. 1 is a partial perspective view of a tractor showing a wheel positioning tool extending from the keyway slot in the tractor axle;

Fig. 2 is a partial perspective view of my wheel positioning tool which is disclosed in my co-pending patent application;

Fig. 3 is a sectional view of my wheel positioning tool taken on line 3—3 of Fig. 2;

Fig. 4 is an end elevation of a tractor axle and the wheel hub with the keyway slots in the axle and hub being in a downward position. The dotted lines in this figure show the position of the hub when it is loosened from the axle;

Fig. 5 is an elevational view similar to that of Fig. 4 except the keyway slots in the hub and axle are in an upward position, and Fig. 6 is a sectional view of my wheel positioning tool, tractor hub and tractor axle taken on line 6—6 of Fig. 5. The dotted lines in this figure show the position of the hub and tool as they slide over the axle member.

I have used the numeral 10 to generally designate a conventional farm tractor having an axle 12, a wheel hub 14, a wheel rim 16 and a tire 18. The wheel hub 14 is one of several such conventional devices and is comprised of two yoke sections 20 and 22. The yoke section 20 is rigidly secured to the center of wheel rim 16 in any convenient manner and the section 22 can be adjustably secured to yoke section 20 by threaded bolts 24 and 26. These bolts are in threaded engagement with yoke 20 but are in rotatable, slidable engagement with yoke 22. It makes no great difference which one of the yoke sections 20 and 22 is rigidly secured to the wheel rim. As shown in Figs. 4 and 5, the yoke sections 20 and 22 are adapted to embrace shaft 12 when they are secured together.

As shown in Figs. 4, 5 and 6, hub section 20 has a keyway slot 28 which is substantially equal in cross section to keyway slot 30 which extends parallel to the longitudinal axis of axle 12. A conventional key 32 is placed in the opening formed by the registering of the keyway slots 28 and 30 and is adapted to fill the opening when the hub 14 is tightened upon the axle 12. Key 32 can be detached from the respective keyways or can be an integral part of the hub section 20.

One step in my method calls for the placing of a friction reducing tool in keyway slot 28 and such a tool is designated by the numeral 34 and is clearly shown in Figs. 2 and 3. This tool 34 is disclosed in my co-pending application and has proved to be very successful although it is appreciated that my method could be practiced with other such tools.

The tool 34 is comprised of an elongated flat bar member 36 having a substantially wide top and bottom portions 38 and 40, respectively, and relatively narrower side portions 42. A plurality of openings 44 extend vertically through bar 36 along its longitudinal axis. These openings 44 are adapted to rotatably receive ball bearing member 46. It should be noted that the ball bearing members 46 are of such diameter that they extend above and below the top 38 and bottom 40, respectively, of bar 36.

The normal procedure to practice my method is as follows: The tractor wheel is first jacked up to permit its free rotation. With the key 32 in the registering keyway slots 28 and 30 and the hub sections 20 and 22 clamped tightly on axle 12 (as shown by the solid lines in Fig. 4), the bolts 24 and 26 are loosened. The hub 14 and axle 12 are then rotated so that the keyway slots 28 and 30 are in a downward position, as shown in Fig. 4. This positioning of the keyway slots 28 and 30 could have taken place before the bolts 24 and 26 were loosened without changing the desired result. When these bolts 24 and 26 have been loosened and the keyway slots 28 and 30 have been positioned, as stated above, the yoke section 20 and key 32 will assume the position shown by the dotted lines in Fig. 4. When the respective keyway slots 28 and 30 are downward, as shown in Fig. 4, gravity will allow hub section 20 to "fall away" from axle 12 because the loosened bolts 24 and 26 will slide through yoke section 22 a limited distance. The bolts 24 and 26 are preferably loosened to a point that key 32 falls away from, but not out of keyway slot 30 in axle 12. The opening formed in keyway slot 30 by the falling away of key 32 should be great enough that tool 34 can be inserted therein. This phase of the operation is complete after the hub sections have been loosened, the respective keyways turned to their lowermost positions, and the tool 34 is inserted into the opening thereupon formed in keyway slot 30.

The second phase of the operation involves the rotation of hub 14 and axle 12 from the position shown by the dotted lines in Fig. 4 to the position shown in Fig. 5. Fig. 5 shows the keyway slots 28 and 30 and key 32 in an upward position. The weight of the tire 18 and wheel rim 16, which are rigidly secured to yoke or hub section 20, then tries to force hub section 20 into engagement with the top of shaft 12. Hub section 20 cannot engage the top of axle 12 because tool 34 is now underneath key 32, and since key 32 cannot completely fall down into the keyway slot 30 in axle 12, the hub section 20 and weight of the tire 18 and rim 16 cannot engage axle 12. The weight of the rim 16, tire 18 and hub section 20 is then supported by key 32 which is in turn supported by tool 34 in groove 30 of axle 12. Since the ball bearings 46 extend above and below bar 36 of tool 34, the weight imposed upon key 32 is actually supported by these ball bearing members themselves. Since ball bearings 46 are rotatably mounted within bar 36, and since the weight of the tractor wheel assembly is then supported on these ball bearings, it is obvious that any lateral pressure on the hub section 20, rim 16, or tire 18, will move the wheel assembly along the longitudinal axis of the axle 12. The tool 34 will move with the wheel assembly and the dotted lines in Fig. 6 show the position of the wheel assembly and tool as the wheel is moved towards the end of axis 12. Since the wheel assembly is entirely supported by ball bearing members 46, very little lateral pressure is required to move the wheel assembly along the longitudinal axis of axle 12.

After the wheel assembly has been moved to the desired position on the axle, the wheel assembly and axle are then rotated back to the position shown by the dotted lines in Fig. 4 where the keyway slots 28 and 30 are in their lowermost position. The tool 34 is then relieved from the weight of the wheel assembly and can be withdrawn from keyway slot 30. The bolts 24 and 26 can then be tightened to pull hub section 20 and key 32 back into tight engagement with axle 12 and keyway slot 30. An alternate method of re-tightening the hub sections would be to once again rotate the hub 14 into the position shown in Fig. 5 and since tool 34 has been removed from keyway slot 30, the key 32 would re-enter the slot 30 and the hub section 20 would fall down upon the top of axle 12. The bolts 24 and 26 can then be tightened to bring hub section 22 into tight engagement with axle 12.

The above described method can be successfully practiced on all vehicles having at least a keyway slot in the axle and a hub having a size-adjustable, axle-receiving opening providing that a proper friction-reducing tool is used as described. It is therefore seen that my invention accomplishes at least all its stated objectives.

Some changes may be made in my method for positioning a wheel upon an axle member without departing from the real spirit of my invention and it is my intention to cover by my claims any modified forms or equivalents of my method which may reasonably be included within their scope.

I claim:

1. A method of axially positioning a wheel having a size-adjustable axle-receiving opening provided with a keyway slot therein, upon an elongated axle having a complementary keyway slot and provided with a key to lock said wheel and said axle against relative rotational movement; comprising the steps of the loosening of said wheel upon said axle by increasing the size of the axle-receiving opening in said wheel whereby said keyways are separated to provide a space in the bottom of said axle keyway; rotating said axle and wheel to a position where said keyway slots extend downwardly, placing a friction reducing tool in said keyway slot space, rotating said axle to a point where said keyway slots extend upwardly and said wheel rests on said friction reducing tool through said key in said keyway slot, longitudinally moving said wheel and said friction reducing tool along the length of said keyway slot to the desired position, rotating said wheel and axle to a position where said keyway slots extend downwardly, removing said friction reducing tool, and finally reducing said axle-receiving opening to clamp the wheel to said axle.

2. A method of axially positioning a wheel having a size-adjustable axle-receiving opening provided with a keyway slot therein, upon an elongated axle having a complementary keyway slot and provided with a key to lock said wheel and said axle against relative rotational movement; comprising the steps of the loosening of said wheel upon said axle by increasing the size of the axle-receiving opening in said wheel whereby said keyways are separated to provide a space between said key and the bottom of one of said keyway slots; rotating said axle and wheel to a position where said keyway slots extend downwardly, placing a friction reducing tool in said keyway slot space, rotating said axle to a point where said keyway slots extend upwardly and said wheel rests on said friction reducing tool and said key in said keyway slot, longitudinally moving said wheel and said friction reducing tool along the length of said keyway slot to the desired position, rotating said wheel and axle to a position where said keyway slots extend downwardly, removing said friction reducing tool, and finally reducing said axle-receiving opening to claim the wheel to said axle.

References Cited in the file of this patent

UNITED STATES PATENTS

| | | |
|---|---|---|
| 1,443,789 | Humphreys | Jan. 30, 1923 |
| 2,495,952 | Allman | Jan. 31, 1950 |
| 2,804,157 | Preston | Aug. 27, 1957 |